(12) United States Patent
Pan

(10) Patent No.: US 6,181,846 B1
(45) Date of Patent: Jan. 30, 2001

(54) FIBEROPTIC LIQUID CRYSTAL ON-OFF SWITCH AND VARIABLE ATTENUATOR

(75) Inventor: Jing-Jong Pan, Milpitas, CA (US)

(73) Assignee: E-Tek Dynamics, Inc., San Jose, CA (US)

( * ) Notice: Under 35 U.S.C. 154(b), the term of this patent shall be extended for 0 days.

(21) Appl. No.: 09/340,858

(22) Filed: Jun. 28, 1999

(51) Int. Cl.[7] .................................. G02B 6/26; G02F 1/13
(52) U.S. Cl. ................................ 385/18; 385/16; 385/33; 385/140; 349/196
(58) Field of Search ........................ 385/16–23, 33–36, 385/140; 349/196, 197, 199

(56) References Cited

U.S. PATENT DOCUMENTS

| | | | |
|---|---|---|---|
| 5,276,747 | * | 1/1994 | Pan ........................................... 385/34 |
| 5,727,109 | | 3/1998 | Pan et al. ............................... 385/140 |
| 5,742,712 | | 4/1998 | Pan et al. ................................. 385/18 |
| 6,023,542 | * | 2/2000 | Pan et al. ............................ 385/33 X |

\* cited by examiner

Primary Examiner—Phan T. H. Palmer
(74) Attorney, Agent, or Firm—Townsend and Townsend and Crew LLP

(57) ABSTRACT

A fiberoptic liquid crystal on-off switch and variable attenuator is provided. The end facets of two optical fiber cores in a sleeve, a birefringent crystal, a quarter-pitch GRIN lens, a liquid crystal cell and a mirror element are arranged and oriented with respect to each other so that light from the first optical fiber core passes through, and back from, the first birefringent crystal, the GRIN lens, the liquid crystal cell and the mirror element into the second optical fiber core when the liquid crystal cell is in a first state. When the liquid crystal cell is in an opposite second state, light from the first optical fiber core passes through, and back from, the first birefringent crystal, the GRIN lens, the liquid crystal cell and the mirror element, but not into the second optical fiber core. If voltages intermediate to those corresponding to the On and Off states are applied to the liquid crystal cell, the amount of light passing between the first and second optical fiber cores are proportionally controlled and the device operates as an attenuator.

25 Claims, 5 Drawing Sheets ially to the strength
FIBEROPTIC LIQUID CRYSTAL ON-OFF SWITCH AND VARIABLE ATTENUATOR

BACKGROUND OF THE INVENTION

The present invention is related to optical fiber networks, and, in particular, to switches for directing optical signals along fibers of an optical network, or to attenuators for controlling the strength of optical signals in an optical fiber.

In optical fiber networks, switches are often used to direct optical signals along one optical fiber or another. Many, if not most of these switches, are electromechanical devices which have parts moving in response to electrical signals. While miniaturization has desirably reduced the switching speeds of such devices, switch parts are still being accelerated and decelerated with the consequent wear and breakdown. Furthermore, physical movement of parts places an effective limitation on further improvement on switching speeds. Hence it is desirable that fiberoptic devices, including switches, be purely optical, or electro-optical devices. Such devices ideally do not have moving parts.

The present invention provides for a switch which is electro-optical. By applying preselected electrical voltages to the switch corresponding to an On state and an Off state, the switch transmits optical signals between two optical fibers or blocks the signals. Furthermore, by applying electrical voltages intermediate the preselected voltages, the switch operates as an electro-optical attenuator. Attenuators are often used in fiberoptic networks to balance the strength of optical signals along different paths. By controlling the voltage to the device of the present invention, the strength of the signals between two optical fibers may be varied.

SUMMARY OF THE INVENTION

The present invention provides for a fiberoptic liquid crystal on-off switch and variable attenuator comprising a sleeve having a central longitudinal channel and an end face; first and second optical fiber cores fixed in the channel, a birefringent crystal next to the sleeve end face, a quarter-pitch GRIN lens having a first end face next to the sleeve end face and the birefringent crystal, a liquid crystal cell next to the opposite end face of the GRIN lens, and a mirror element next to the liquid crystal cell. End facets of the first and second optical fiber cores, the birefringent crystal, the GRIN lens, the liquid crystal cell and the mirror element are arranged and oriented with respect to each other so that light from the first optical fiber core passes through, and back from, the first birefringent crystal, the GRIN lens, the liquid crystal cell and the mirror element into the second optical fiber core when the liquid crystal cell is in a first state. When the liquid crystal cell is in an opposite second state, light from the first optical fiber core passes through, and back from, the first birefringent crystal, the GRIN lens, the liquid crystal cell and the mirror element, but not into the second optical fiber core.

The first and second states of the liquid crystal cell are the extreme On and Off states so that the operation of the described device is that of a switch. If voltages intermediate to those corresponding to the On and Off states are applied to the liquid crystal cell, the amount of light passing between the first and second optical fiber cores are proportionally controlled. The device operates as an attenuator.

DESCRIPTION OF THE SPECIFIC EMBODIMENTS

Figure 1:
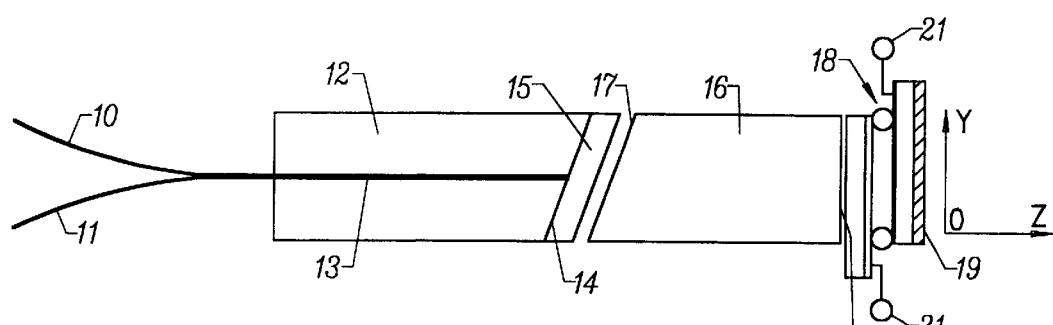
FIG. 1 is a representational cross-sectional side view of a fiberoptic liquid crystal on-off switch variable attenuator device, according to one embodiment of the present invention.

FIG. 1 illustrates the arrangement of the elements of a fiberoptic liquid crystal on-off switch and variable attenuator device, according to one embodiment of the present invention. The device has two optical fibers 10 and 11. Typically, these optical fibers are single mode optical fibers. The ends of the fibers 10 and 11 are held in a central longitudinal channel 13 of a glass ferrule 12 and the end facets of the two fibers are co-planar with an end face 14 of the ferrule 12. The end face 14 (and the end facets of the fibers 10 and 11) is slightly slanted with respect to the longitudinal axis of the ferrule 12. A birefringent crystal 15 is fixed over the end facets of the two fiber 10 and 11. Facing the birefringent crystal 15 and the ferrule end face 14 is a reciprocally slanted end face 17 of a collimating GRIN (GRaded INdex) lens 16. The end facets of the fibers 10 and 11 are displaced from the longitudinal (and optical) axis of the GRIN lens 16. At an opposite end face 20 of the GRIN lens 16 is placed a liquid crystal cell 18 with electrical terminals 21.

Following the liquid crystal cell 18 is a mirror element 19, which is highly reflective. The element 19 may be a dielectric multilayer mirror, or a metallic mirror, formed as a separate element, such as a coated plate, or simply coated on the far surface of the cell 18. Alternatively, if a reflective metallic coating (rather than the commonly used ITO conductive film) is used as the farside electrode of the liquid crystal cell 18, the mirror element 19 is combined into liquid crystal cell 18.

The birefringent crystal 15 is a parallel plate with its principal plane forming a 45° angle with the alignment direction of the liquid crystal cell 18. The birefringent crystal 15 separates the light from one fiber into two offset, partially overlapping beams. When the liquid crystal cell is in an On state, the liquid crystal cell provides a quarter-wave retardation for the light beams. After reflection off the mirror element 19, the liquid crystal cell provides another quarter-wave retardation so that the beams are rotated by 90°. The two beams have exchanged polarization states. This exchange allows the birefringent crystal 15 to combine the two beams before the core end facet of the other fiber. On the other hand, if the liquid crystal cell 18 is in its Off state, the cell provides no phase retardation so that the two beams do not change their polarization states. The light have the wrong polarization directions upon reaching the birefringent crystal 15 after reflection. The two beams are further separated after passing through the birefringent crystal 15 and are directed away from the end facet of the core of the other fiber.

Figure 2A:
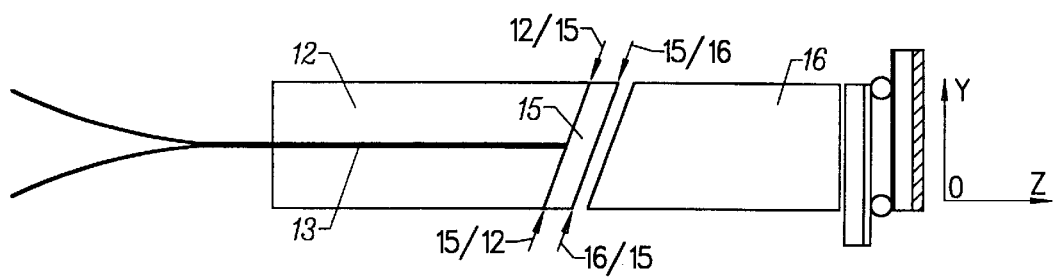
FIG. 2A is a cross-sectional side view of the FIG. 1 device with locations between elements indicated.
Figure 2B:
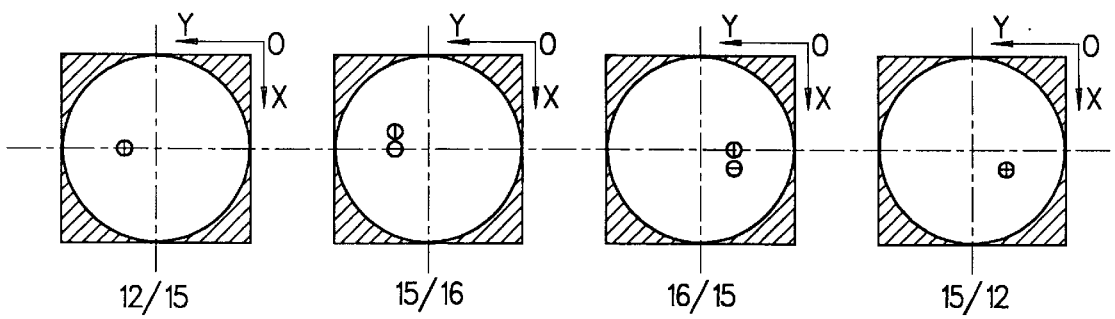
FIG. 2B a representation of the state of the light traveling through the FIG. 1 device at the locations indicated in FIG. 2A when the liquid crystal cell in an On state.
Figure 2C:
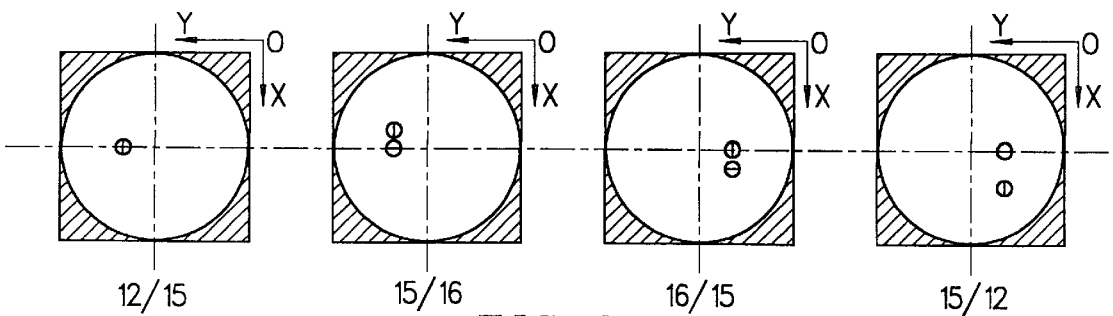
FIG. 2C is a representation of the state of the light traveling through the device at the locations indicated in FIG. 2A when the liquid crystal cell is in an Off state.

FIGS. 2A, 2B and 2C detail the operation of the FIG. 1 device and its elements. In the cross-sectional side view of FIG. 2A, a location between elements is indicated by the notation, i/j, i.e., the location between the element having reference numeral i and the element having reference numeral j. The direction of the light is also indicated by the order of the reference numerals. Hence, the notation, i/j, also indicates the direction of the light at the location between elements i and j to be from the element i toward element j. FIG. 2B represents the state of the light traveling from the optical fiber 10 to the optical fiber 11 through the device at the locations indicated in FIG. 2A when the liquid crystal cell 18 is turned On; FIG. 2C represents the state of the light traveling in the same direction when the liquid crystal cell 18 is turned Off. It should be noted the direction of the light was selected arbitrarily since the direction of the light is reversible.

As represented by FIG. 2B, the light at the end facet of the fiber 10 is shown at the location 12/15. Note that the input light is displaced from the optical longitudinal axis of the GRIN lens 16 at the center of the location drawing. The birefringent crystal 15 separates the light into its two linear polarization components, the o-ray and the e-ray. Location 15/16 illustrates this separation according to the state of polarization of the light. The light then is collimated by the GRIN lens 16, which is slightly shorter than a quarter-pitch. When the liquid crystal cell 18 in the On state, the cell 18 operates as a half-wave plate. A phase difference of 90° between the two polarization component is introduced after the light passes through the cell 18 once. The light is then sent back through the liquid crystal cell 18 again by the mirror element 19 and an additional phase difference of 90° between the two polarization component is introduced. Since the alignment direction of the liquid crystal cell 18 forms a 45° angle with both polarization states, the two polarized component beams exchange their relative positions vertically and horizontally. Their positions are symmetrical to their original positions at location 15/16 around the GRIN lens optical axis. In passing, it should be noted that a nonreciprocal (unlike a Faraday rotator, which is reciprocal) 45° polarization rotator can used in place of the liquid crystal cell 18, as long as the rotator can be turned off and on in response to some control signal, such as electric voltage.

The light enters the birefringent crystal 15 again, as represented by the location 16/15. Since the two component beams have switched polarization states, the birefringent crystal 15 combines both polarized component beams into one, as illustrated by the location 15/12. The combined beam is aligned with the end facet of the second fiber 11 so that the light path through the device is complete. Light enters one fiber 10 and leaves through the other fiber 11. In passing, it should be noted that the end facets of the fibers 10 and 11 are not located symmetrically about the axis of the GRIN lens 16. See the locations 12/15 and 15/12 of FIG. 2B in particular. The asymmetric locations are due to the walk-off of the birefringent crystal 15; the GRIN lens 16 itself has symmetric characteristics about its optical axis.

Such is not the case if the liquid crystal cell 18 is in the Off state. Light leaving the end facet of the fiber 10 is shown by the location 12/15 of FIG. 2C, as in the description above. The light is again split into the two polarized component beams by the birefringent crystal 15, as shown by location 15/16. The light beams are then collimated by the GRIN lens 16 and passed to the liquid crystal cell 18. Since the cell 18 is Off, no rotation occurs and the light is reflected by the mirror element 19. The light beams pass through the liquid crystal cell 18 again unchanged and refocused by the GRIN lens 16. The result is shown by the location 16/15 in FIG. 2C. However, only the mirror element 19 and GRIN lens 16 have acted upon the component beams so that each component beam is flipped around with respect X and Y axes with no change in polarization. This can be seen by comparing the locations 16/15 of FIGS. 2B and 2C. In this case, the birefringent crystal 15 cannot combine the two polarized beams into one beam at the end facet of the other fiber 11. With the liquid crystal cell 18 in the Off state, light entering from one fiber 10 does not enter the other fiber 11.

Figure 3A:
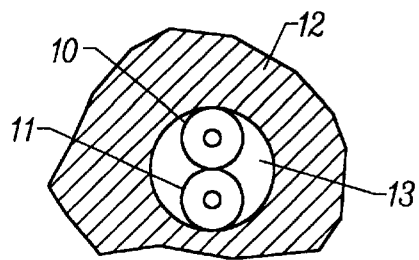
FIG. 3A a cross-sectional end view of the ferrule channel and fiber end facets of the FIG. 1 device.
Figure 3B:
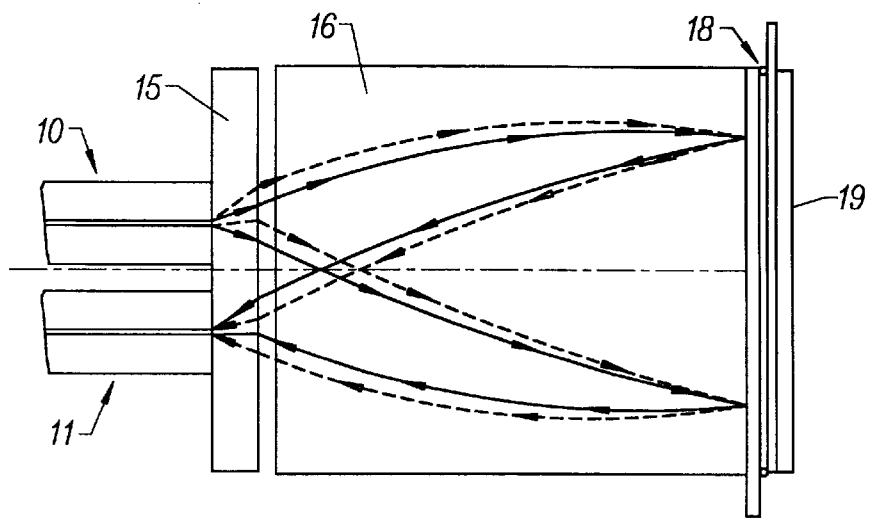
FIG. 3B is a representation of the two polarized beam components of the light through the GRIN lens of the FIG. 1 device when the liquid crystal cell is in an On state.
Figure 3C:
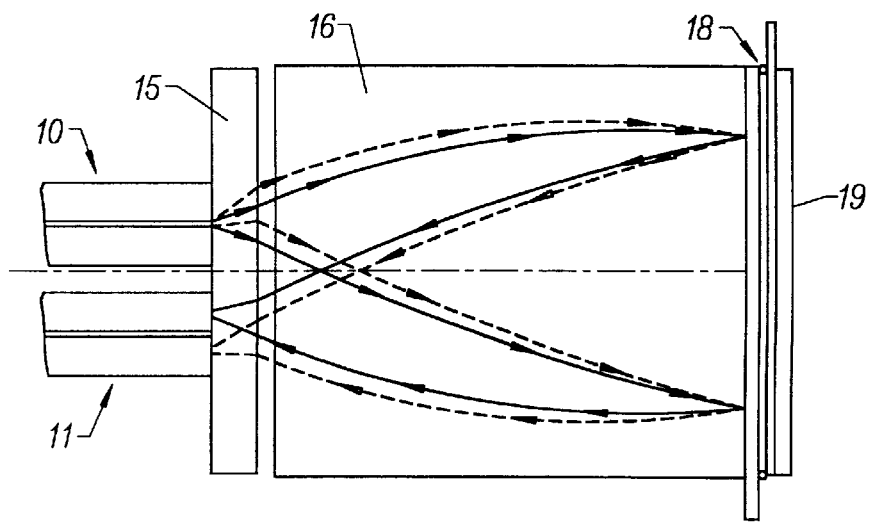
FIG. 3C is a representation of the two polarized beam components of the light through the GRIN lens of the FIG. 1 device when the liquid crystal cell is in an Off state.

The action of the liquid crystal cell 18 in its On-Off state is also illustrated by FIGS. 3A–3C. FIG. 3A is an end view of a portion of the ferrile channel 13 and the end facets of the two optical fibers 10 and 11. FIG. 3B shows how light from the core of the fiber 10 is separated into polarization components by the birefringent crystal 15 and the two polarization components refocused and combined into one beam at the core of the second fiber 11 when the liquid crystal cell 18 is On. FIG. 3C shows how light from the core of the fiber 10 is separated into polarization components by the birefringent crystal 15 and the two polarization components remain separated and directed away from the core of the second fiber 11 when the liquid crystal cell 18 is Off.

Figure 4A:
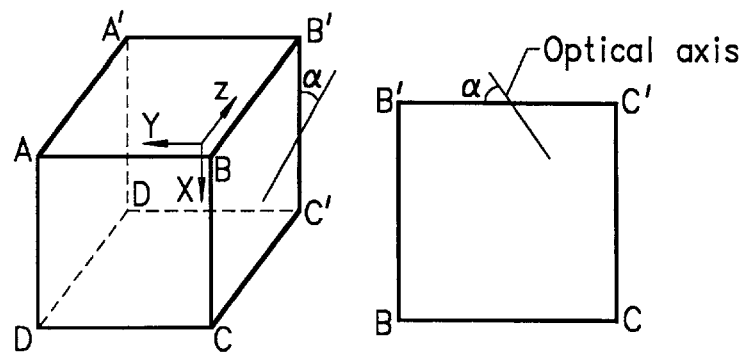
FIG. 4A illustrates the orientation of the birefringent crystal of the FIG. 1 device.
Figure 4B:
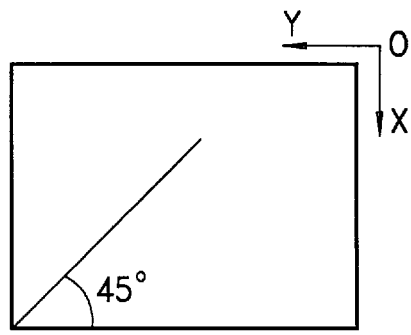
FIG. 4B illustrates the orientation of the liquid crystal cell of the FIG. 1 device.

The birefringent crystal 15 is a parallel plate with a thickness in the range from 300–500 $\mu$m. The birefringent crystal 15 can be formed from any number of birefringent crystal material, such as calcite, rutile, $YVO_4$, lithium niobate and so on. FIG. 4A illustrates the orientation of the birefringent crystal 15 and FIG. 4B illustrates the orientation of the liquid crystal cell 18. The principal plane of the birefringent crystal 15 is represented by the square BB'CC' in FIG. 4A and the plane of the liquid crystal cell 18 may be represented by the square A'B'C'D'. The optical axis of the birefringent crystal 15 is in the principal plane and 45° to the leg B'C' (or CC'). The alignment direction of the liquid crystal cell 18 forms a 45° angle with the leg A'B' (or B'C') so as to be 45° to the principal plane BB'CC' of the birefringent crystal 15. Electrical voltage signals on the control terminals 21 create the electric fields to align the liquid crystals in the cell 18 in one direction or the other to create the On and Off states. A description of a liquid crystal cell which might be used in the present invention is found in U.S. Pat. No. 5,727,109, entitled "OPTICAL ATTENUATOR WITH LOW POLARIZATION MODE DISPERSION," which issued Mar. 10, 1998 to J. J. Pan et al. and which is assigned to the present assignee.

It should be noted that the On and Off states represent two opposite states for the liquid crystal cell 18. Either a voltage ($V_{On}$) is applied to the cell 18 such that the liquid crystals in the cell 18 are completely aligned, the On state, or another voltage ($V_{Off}$) is applied so that the liquid crystals do not change the polarization of the light passing through the cell, the Off state. However, if an intermediate voltage is applied so that the liquid crystals are partially aligned, some light will pass from one optical fiber to the other. Hence, as the voltage corresponding to the On state, is lowered, the light through the described device is increasingly attenuated until the voltage corresponding to the Off state is reached. Hence the described device can operate as a switch by toggling the voltage to the liquid crystal cell between the On and Off states. The described device can also be operated as an attenuator by using voltages intermediate the voltages corresponding to the On and Off states.

Besides separate optical fibers, the fiberoptic liquid crystal on-off switch and variable attenuator device may be more easily manufactured by using a joined optical fiber subassembly, as illustrated in FIGS. 5A–5D. In the top view of FIG. 5A, two separate optical fibers 30 and 31 are joined together such that cores of the two fibers 30 and 31 remain separate in a single cladding. The subassembly can be organized into three sections. A section 40 has the optical fibers 30 and 31 separated and independent; a section 42 has the fibers completely joined into a single cladding; and a section 41 between the sections 40 and 42 represents a transition region from separate optical fibers to completely joined fibers.

Figure 5A:
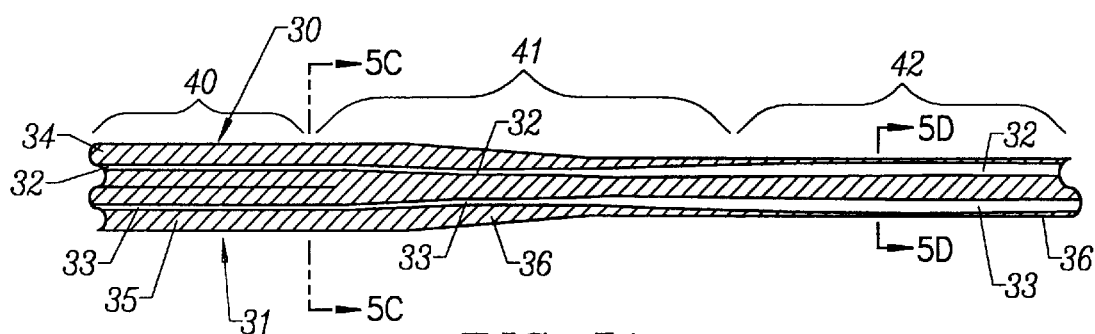
FIG. 5A is a top view of a joined optical fiber subassembly which can be used in the FIG. 1 device.
Figure 5B:
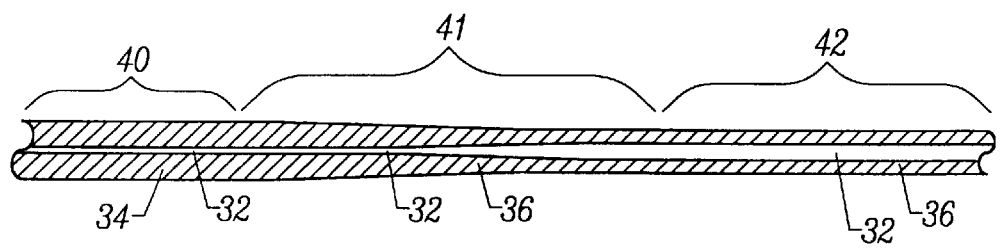
FIG. 5B is a side view of the joined optical fiber subassembly of FIG. 5A.
Figure 5C:
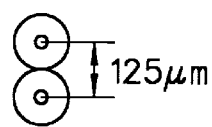
FIG. 5C is a cross-sectional end view the joined optical fiber subassembly along line C–C' in FIG. 5A.

In the section 40 of the subassembly, the two separate optical fibers 30 and 31 have their own core and surrounding cladding. The fiber 30 has a core 32 with a cladding 34 and the fiber 31 has a core 33 with a cladding 35. In the present embodiment, the two optical fibers 30 and 31 are single mode fibers, specifically SMF-28 fibers, each fiber having a cladding outside diameter of 125 $\mu$m and a core diameter of 8.3 $\mu$m. FIG. 5C is a cross-section along a dotted line C–C' in FIG. 5A of the two fibers 30 and 31. Since the center radius of each fiber 30 and 31 is 62.5 $\mu$m (125 $\mu$m/2), the center axes of the two fibers are separated by 125 $\mu$m. Likewise, the width across the cladding of the two fibers touching is 250 $\mu$m.

Figure 5D:
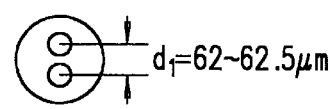
FIG. 5D is a cross-sectional end view of the joined optical fiber subassembly along line D–D' in FIG. 5A.

In the section 42, the fibers 30 and 31 are joined together into a single fiber. Each core 32 and 33 is still separated from the other, but a single cladding 36 surrounds both cores. In this section, the diameters of the cores 32 and 33, along with that of the cladding 36 are constant. But as shown in FIG. 5D, a cross-section end view along a dotted line D–D' in FIG. 5A, the cores 32 and 33 are closer together, as compared to the separation in the section 40. The center axes of the two cores 32 and 33 are approximately 62.0 to 62.5 $\mu$m apart. Furthermore, the diameters of the cores 32 and 33 have expanded in this section 42 in a range of 18 to 22 $\mu$m and the diameter of the cladding 36 across the two cores is approximately 177 $\mu$m.

The section 41 is the transition region where the separate fibers 30 and 31 of section 40 merge into a single fiber of section 42. Near the section 40 the two fibers 30 and 31 begin as separate fibers. The two claddings 34 and 35 merge into the single cladding 36 as one moves toward the section 42. It should be noted that the diameters of the cores 32 and 33, along with that of the cladding 36, undergo changes. The cladding 36 forms a narrowing taper in the direction from the section 40 to the section 42. On the other hand, the cores 32 and 33 form an expanding taper in the same direction. These features may be best seen in FIG. 5B, a side view of the unitary optical fiber subassembly. Starting from the narrow diameter of the single mode fiber cores 32 and 33 in section 40, the cores gradually expand into the large diameter cores in the section 42. Conversely, the claddings 34 and 35 in the section 40 narrow into the single cladding 36 in the section 42.

Figure 6:
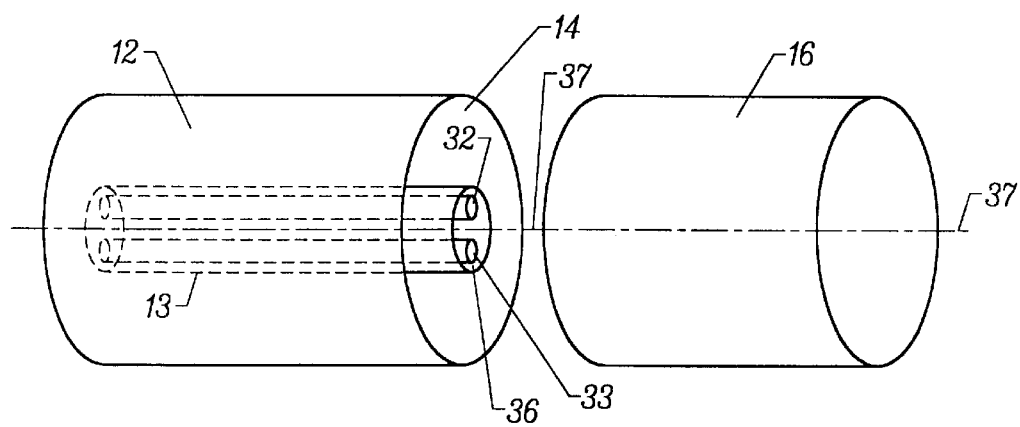
FIG. 6 is a detailed perspective view of the joined optical fiber subassembly in the sleeve channel of the FIG. 1 device.

The transition and joined sections 41 and 42 of the joined optical fiber subassembly is inserted and fixed in the central longitudinal channel 13 of the sleeve 12. FIG. 6 shows the end facets of the expanded cores 32 and 33 with the surrounding cladding 36 in the joined section 42. The end facets are co-planar with the end face 14 of the sleeve 12. To better illustrate the arrangement of the end facets with respect to the GRIN lens 16, the birefringent crystal 15 is not shown in this drawing. A line 37 represents the optical axis of the GRIN lens 16 and the alignment of the end facets of the cores 32 and 33 on either side of the axis. The end face 14 of the sleeve 12 is polished at a small angle 8–12° from the plane perpendicular to the longitudinal axis of the sleeve 12. The end face 17 of the GRIN lens 16 is reciprocally slanted. Both the end face 17 and its opposite end face 20 are coated with anti-reflection material.

With this joined optical fiber subassembly, manufacturing should be easier than individual optical fibers inserted into the sleeve. Furthermore, alignment tolerances are more lenient because of the larger diameters of the expanded cores 32 and 33. Further details of the joined optical fiber subassembly may be found in U.S. Appln. Ser. No. 09/342,456, entitled "A Joined Optical Fiber Subassembly, Method of Manufacture and Resulting Optical Devices," filed of even date by J. J. Pan et al. and assigned to the present assignee (Attorney's Docket No. 13011–80), which is hereby incorporated by reference.

Figure 7:
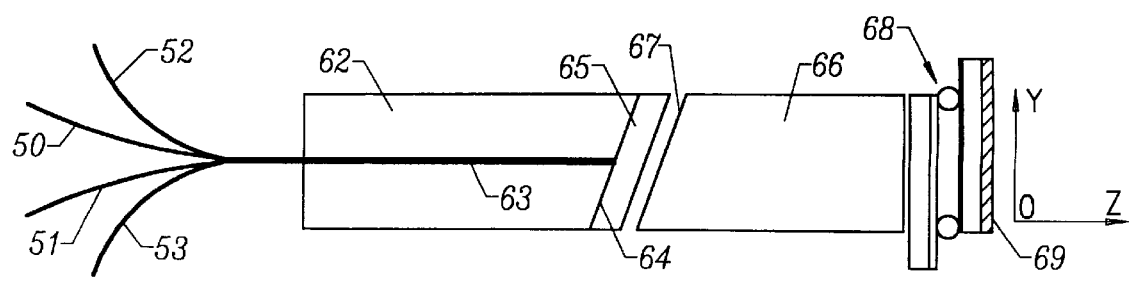
FIG. 7 is a representational cross-sectional side view of multiple fiberoptic liquid crystal on-off switch and variable attenuator device, according to another embodiment of the present invention.

The present invention also offers the advantage of a plurality of fiberoptic liquid crystal on-off switch and variable attenuator devices in a single assembly. FIG. 7 illustrates a double device, i.e., a liquid crystal on-off switch and variable attenuator which operates on two pairs of optical fibers at once. The device has a first pair of fibers 50 and 51, and a second pair of fibers 52 and 53. As described with respect to the device of FIG. 1, the FIG. 7 device has a ferrule 62 which holds the ends of the four optical fibers 50–53 in a central longitudinal channel 63, a birefringent crystal 65, a GRIN lens 66, a liquid crystal cell 68 and a mirror element 69. The device operates as described previously. However, the end facets of the cores of the optical fibers 50–51 in the ferrule channel 63 are arranged with the respect to the optical axis of the GRIN lens 66 so that light can travel between the fibers 50 and 51, and between the fibers 52 and 53 when the liquid crystal cell 68 is in the On state. When the liquid crystal cell 68 is Off, no light travels between any of the optical fibers.

Figure 8A:
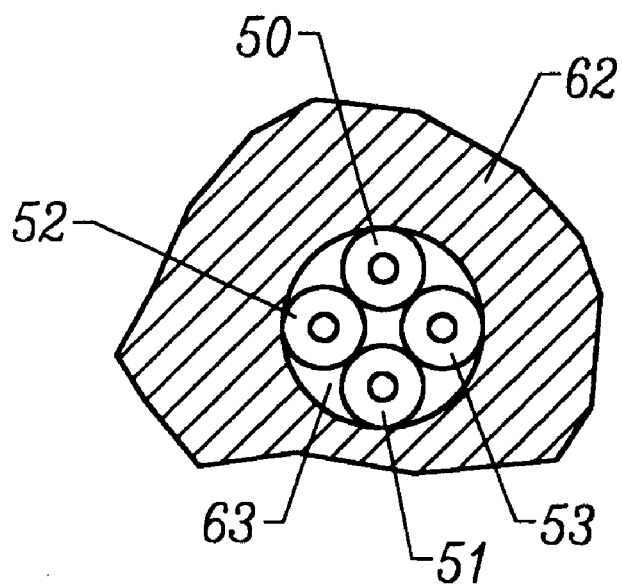
FIG. 8A is a cross-sectional end view of the ferrule channel with separate fiber end facets of the FIG. 7 device.
Figure 8B:
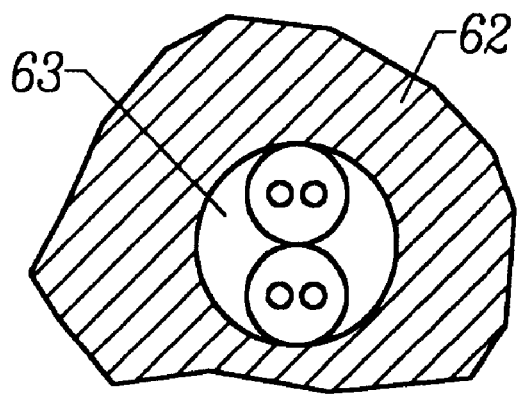
FIG. 8B is a cross-sectional end view of the ferrule channel of the FIG. 7 device with the end facets of two joined optical fiber subassemblies.

FIG. 8A is an end view of the ferrule channel 63 holding the four separate optical fibers 50–53. The four optical fibers 50–53 can also be in the form of two joined optical fiber subassemblies, as shown in FIG. 8B. Note that in this drawing the optical fiber reference numbers 50–53 indicate the core of the fiber and that the fibers of each pair belong to different joined optical fiber subassemblies.

While the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A fiberoptic liquid crystal on-off switch and variable attenuator comprising
    a sleeve having a central longitudinal channel and an end face;
    first and second optical fiber cores fixed in said channel, each of said cores defined by cladding material around said core;
    a birefringent crystal proximate said sleeve end face;
    a collimating GRIN lens having first and second end faces, said first end face proximate said sleeve end face and said birefringent crystal;
    a liquid crystal cell proximate said second face of said GRIN lens, said liquid crystal cell having electrical terminals and in a first state or a second state responsive to preselected voltages applied to said electrical terminals; and
    a mirror element proximate liquid crystal cell, said end facets, said birefringent crystal, said GRIN lens, said liquid crystal cell and said mirror element arranged and oriented with respect to each other so that light from said first optical fiber core passes through, and back from, said first birefringent crystal, said GRIN lens, said liquid crystal cell and said mirror element into said optical fiber second core when said liquid crystal cell is in said first state, and light from said first optical fiber core passes through, and back from, said first birefringent crystal, said GRIN lens, said liquid crystal cell and said mirror element, but not into said second optical fiber core when said liquid crystal cell is in said second state.

2. The fiberoptic liquid crystal on-off switch and variable attenuator of claim 1 wherein cladding material around said first optical fiber core is separate from cladding material around second optical fiber core so that separate optical fibers are defined in said central longitudinal channel.

3. The fiberoptic liquid crystal on-off switch and variable attenuator of claim 1 wherein cladding material around said first optical fiber core continues around said second optical fiber core so that separate optical fibers are not defined in said central longitudinal channel.

4. The fiberoptic liquid crystal on-off switch and variable attenuator of claim 1 wherein said birefringent crystal comprises a material selected from the group consisting of calcite, rutile, $YVO_4$, and lithium niobate.

5. The fiberoptic liquid crystal on-off switch and variable attenuator of claim 1 wherein said mirror element comprises a plate separate from said liquid crystal cell.

6. The fiberoptic liquid crystal on-off switch and variable attenuator of claim 5 wherein said mirror element comprise multiple layers of dielectric material coating on said plate.

7. The fiberoptic liquid crystal on-off switch and variable attenuator of claim 1 wherein said mirror element comprises at least one coating on said liquid crystal cell.

8. The fiberoptic liquid crystal on-off switch and variable attenuator of claim 7 wherein said mirror element comprises multiple layers of dielectric material.

9. The fiberoptic liquid crystal on-off switch and variable attenuator of claim 1 wherein said first and second optical fiber cores each having an end facet co-planar with said end face of said sleeve.

10. The fiberoptic liquid crystal on-off switch and variable attenuator of claim 1 further comprising third and fourth optical fiber cores fixed in said central longitudinal sleeve channel, each of said cores defined by cladding material around said core and having an end facet, said end facets of said third and fourth optical fiber cores, said birefringent crystal, said GRIN lens, said liquid crystal cell and said mirror element arranged and oriented with respect to each other so that light from said third optical fiber core passes through, and back from, said first birefringent crystal, said GRIN lens, said liquid crystal cell and said mirror element into said fourth optical fiber core when said liquid crystal cell is in said first state, and light from said third optical fiber core passes through, and back from, said first birefringent crystal, said GRIN lens, said liquid crystal cell and said mirror element, but not into said fourth optical fiber core when said liquid crystal cell is in said second state.

11. The fiberoptic liquid crystal on-off switch and variable attenuator of claim 10 wherein cladding material around each of said optical fiber cores is separate from cladding material around said other optical fiber cores so that separate optical fibers are defined in said central longitudinal channel.

12. The fiberoptic liquid crystal on-off switch and variable attenuator of claim 10 wherein cladding material around said first optical fiber core continues around said third optical fiber core and cladding material around said second optical fiber core continues around said fourth optical fiber core so that four separate optical fibers are not defined in said central longitudinal channel.

13. The fiberoptic liquid crystal on-off switch and variable attenuator of claim 10 wherein cladding material around said first optical fiber core continues around said fourth optical fiber core and cladding material around said second optical fiber core continues around said third optical fiber core so that four separate optical fibers are not defined in said central longitudinal channel.

14. The fiberoptic liquid crystal on-off switch and variable attenuator of claim 1 wherein said end facets of said first and second optical fiber cores, said birefringent crystal, said GRIN lens, said liquid crystal cell and said mirror element arranged and oriented with respect to each other so that light from said first optical fiber core passes through, and back from, said first birefringent crystal, said GRIN lens, said liquid crystal cell and said mirror element, and proportionally into said second optical fiber core corresponding to voltages intermediate said preselected voltages.

15. The fiberoptic liquid crystal on-off switch and variable attenuator of claim 1 wherein said mirror element comprises a metallic coating electrode on said liquid crystal cell.

16. A fiberoptic liquid crystal on-off switch and variable attenuator comprising
    a sleeve having a central longitudinal channel and an end face;
    first and second optical fiber cores fixed in said channel, each of said cores defined by cladding material around said core;
    a birefringent crystal proximate said sleeve end face;
    a collimating GRIN lens having first and second end faces, said first end face proximate said sleeve end face and said birefringent crystal;
    a liquid crystal cell proximate said second face of said GRIN lens, said liquid crystal cell having electrical terminals and in a first state or a second state responsive to preselected voltages applied to said electrical terminals; and a mirror element formed as part of said liquid crystal cell, said end facets, said birefringent crystal, said GRIN lens, said liquid crystal cell and said mirror element arranged and oriented with respect to each other so that light from said first optical fiber core passes through, and back from, said first birefringent crystal, said GRIN lens, said liquid crystal cell and said mirror element into said optical fiber second core when said liquid crystal cell is in said first state, and light from said first optical fiber core passes through, and back from, said first birefringent crystal, said GRIN lens, said liquid crystal cell and said mirror element, but not into said second optical fiber core when said liquid crystal cell is in said second state.

17. The fiberoptic liquid crystal on-off switch and variable attenuator of claim 16 wherein said first and second optical fiber cores each having an end facet co-planar with said end face of said sleeve.

18. The fiberoptic liquid crystal on-off switch and variable attenuator of claim 16 wherein cladding material around said first optical fiber core is separate from cladding material around second optical fiber core so that separate optical fibers are defined in said central longitudinal channel.

19. The fiberoptic liquid crystal on-off switch and variable attenuator of claim 16 wherein cladding material around said first optical fiber core continues around said second optical fiber core so that separate optical fibers are not defined in said central longitudinal channel.

20. The fiberoptic liquid crystal on-off switch and variable attenuator of claim 16 wherein said birefringent crystal comprises a material selected from the group consisting of calcite, rutile, $YVO_4$, and lithium niobate.

21. The fiberoptic liquid crystal on-off switch and variable attenuator of claim 16 further comprising third and fourth optical fiber cores fixed in said central longitudinal sleeve channel, each of said cores defined by cladding material around said core and having an end facet, said end facets of said third and fourth optical fiber cores, said birefringent crystal, said GRIN lens, said liquid crystal cell and said mirror element arranged and oriented with respect to each other so that light from said third optical fiber core passes through, and back from, said first birefringent crystal, said GRIN lens, said liquid crystal cell and said mirror element into said fourth optical fiber core when said liquid crystal cell is in said first state, and light from said third optical fiber core passes though, and back from, said first birefringent crystal, said GRIN lens, said liquid crystal cell and said mirror element, but not into said fourth optical fiber core when said liquid crystal cell is in said second state.

22. The fiberoptic liquid crystal on-off switch and variable attenuator of claim 21 wherein cladding material around said first optical fiber core continues around said fourth optical fiber core and cladding material around said second optical fiber core continues around said third optical fiber core so that four separate optical fibers are not defined in said central longitudinal channel.

23. The fiberoptic liquid crystal on-off switch and variable attenuator of claim 21 wherein cladding material around each of said optical fiber cores is separate from cladding material around said other optical fiber cores so that separate optical fibers are defined in said central longitudinal channel.

24. The fiberoptic liquid crystal on-off switch and variable attenuator of claim 21 wherein cladding material around said first optical fiber core continues around said third optical fiber core and cladding material around said second optical fiber core continues around said fourth optical fiber core so that four separate optical fibers are not defined in said central longitudinal channel.

25. A fiberoptic liquid crystal on-off switch and variable attenuator comprising a joined optical fiber subassembly having
  a first section having first and second independent optical fibers, each optical fiber having a core and cladding, said cladding enclosing said core of said optical fiber;
  a second section adjoining said first section, said second section having said optical fibers joined, a single cladding enclosing said cores of said optical fibers, a diameter of said single cladding decreasing in a taper away from said first section, a diameter of each core of said optical fibers increasing in a taper away from said first section; and
  a third section adjoining said second section, said third section having said single cladding enclosing said cores of said optical fibers, said diameter of said single cladding a constant diameter and said cores of said optical fibers having constant diameters;

a sleeve having a central longitudinal channel and an end face, said channel holding said third section of joined optical fiber subassembly, said cores of said first and second optical fibers having end facets;

a birefringent crystal proximate said sleeve end face;

a collimating GRIN lens having first and second end faces, said first end face proximate said sleeve end face and said birefringent crystal;

a liquid crystal cell proximate said second face of said GRIN lens, said liquid crystal cell having electrical terminals and in a first state or a second state responsive to preselected voltages applied to said electrical terminals; and a mirror element proximate liquid crystal cell, said end facets of said first and second optical fibers, said birefringent crystal, said GRIN lens, said liquid crystal and said mirror element arranged and oriented with respect to each other so that light from said end facet of said first optical fiber passes through, and back from, said first birefringent crystal, said GRIN lens, said liquid crystal cell and said mirror element into said end facet of said second optical fiber when said liquid crystal cell is in said first state, and light from said end facet of said first optical fiber passes through, and back from, said first birefringent crystal, said GRIN lens, said liquid crystal cell and said mirror element, but not into said end facet of said second optical fiber when said liquid crystal cell is in said second state.

* * * * *

UNITED STATES PATENT AND TRADEMARK OFFICE
CERTIFICATE OF CORRECTION

PATENT NO : US 6,181,846 B1
DATED : January 30, 2001
INVENTOR(S) : Jing-Jong Pan It is certified that error appears in the above-identified patent and that said Letters Patent are hereby corrected as shown below:

Claim 1, line 23, change "facets" to --faces--.

Signed and Sealed this

Fifteenth Day of May, 2001

*Attest:*

NICHOLAS P. GODICI

*Attesting Officer*     *Acting Director of the United States Patent and Trademark Office*